Patented Nov. 14, 1944

2,362,961

UNITED STATES PATENT OFFICE 2,362,961

PLASTIC COMPOSITIONS

William E. Welch, Springfield, Mass., assignor to Monsanto Chemical Company, St. Louis, Mo., a corporation of Delaware No Drawing. Application November 1, 1940, Serial No. 363,812

6 Claims. (Cl. 260—3)

This invention relates to improved plastic compositions and, more particularly, to improved plastic compositions for golf ball covers.

For certain purposes, as for example, for covers for balls and particularly for covers for golf balls, a tough, resilient material is desirable. In the past, compositions comprising mixtures of rubber and balata have been employed to a considerable extent for such purposes. Balata, however, is a relatively expensive material and, furthermore, is subject to oxidation and to discoloration. It is thus apparent that it is very desirable to provide compositions which are suitable for such uses as golf ball covers wherein the balata has been reduced or eliminated.

It is an object of this invention to provide improved plastic compositions comprising mixtures of rubber and polyvinyl acetal resins. It is a particular object of this invention to provide compositions comprising mixtures of rubber and polyvinyl acetal resins which are suitable for golf ball covers.

According to the present invention, improved compositions of matter especially suitable for golf ball covers can be prepared by mixing together rubber and a polyvinyl actal resin in a suitable manner. If desired, these compositions may be rendered capable of subsequent vulcanization by incorporating in a suitable manner vulcanization ingredients with the other components. The resulting compositions, whether containing vulcanization ingredients or not, can be employed in any desired manner. For example, in the preparation of golf ball covers, hemispherically shaped cups may be formed in a suitable mold and thereafter molded with heat and pressure over golf ball cores.

Typical examples of the new compositions of the present invention follow, the parts being by weight.

Example I

| | Parts |
|---|---|
| Polyvinyl butyraldehyde acetal | 45 |
| Pale crepe rubber | 50 |
| Diethyl phthalate | 5 |
| Titanium dioxide | 10 |

The polyvinyl butyraldehyde acetal employed in this example contained substantially 17 to 21% hydroxyl groups calculated as polyvinyl alcohol, less than 3% acetate by weight and the balance acetal. This partial polyvinyl acetal was prepared by hydrolyzing polyvinyl acetate, of such a degree of polymerization that a one-molar benzene solution possessed a viscosity of substantially 25 centipoises at 20° C., and then reacting the polyvinyl alcohol thus produced with butyraldehyde by one of the well-known processes.

The several components in this example were mixed together in a suitable manner, as for example, by mixing on hot milling rolls at a front roll temperature of substantially 255° F. and a back roll temperature of substantially 150° F. Generally, the rubber and pigment, for example, titanium dioxide, were mixed together on the rolls and then the polyvinyl acetal in which had previously been incorporated the plasticizer, for example, diethyl phthalate, was mixed with the rubber-pigment mixture. The resulting composition was substantially homogeneous and was exceedingly tough, resilient and highly resistant to abrasion and cutting.

Example II

| | Parts |
|---|---|
| Polyvinyl butyraldehyde acetal | 45 |
| Pale crepe rubber | 50 |
| Diethyl phthalate | 5 |
| Titanium dioxide | 5 |

The polyvinyl butyraldehyde acetal employed in this example contained substantially 17 to 21% hydroxyl groups calculated as polyvinyl alcohol, less than 3% acetate by weight and the balance acetal. This partial polyvinyl acetal was prepared by hydrolyzing polyvinyl acetate, of such a degree of polymerization that a one-molar benzene solution possessed a viscosity of substantially 55 centipoises at 20° C., and then reacting the polyvinyl alcohol thus produced with butyraldehyde by one of the well-known processes.

The several components were mixed together in a suitable manner, such as that described in Example I. In the present example, a front mixing roll temperature of substantially 260° F. and a back mixing roll temperature of substantially 160° F. were employed. The resulting composition possessed properties similar to that of the product of Example I.

| | Parts |
|---|---|
| Polyvinyl formaldehyde acetal | 45 |
| Pale crepe rubber | 50 |
| Diethyl phthalate | 10 |
| Titanium dioxide | 10 |
| Aluminum stearate | 1 |

The polyvinyl formaldehyde acetal employed in this example contained substantially 5 to 7% hydroxyl groups, calculated as polyvinyl alcohol, substantially 9 to 14% acetate by weight and the balance acetal. This partial polyvinyl acetal was prepared by hydrolyzing polyvinyl acetate of such a degree of polymerization that a one-molar benzene solution possessed a viscosity of substantially 8 centipoises at 20° C., and then reacting the polyvinyl alcohol thus produced with formaldehyde by one of the well-known procesess.

The several components were mixed together in a suitable manner, such as that described in Example I. In the present example, a front mixing roll temperature of substantially 310° F. and a back mixing roll temperature of substantially 210° F. were employed. The aluminum stearate was mixed with the rubber at the same time that the pigment was incorporated. The product possessed properties similar to those of the product of Example I.

While the foregoing examples all show unvulcanized compositions it is sometimes advantageous, as previously indicated, to subject the compositions to vulcanization. Thus, two batches corresponding to the following formulation were prepared in the same manner as in Example I.

| | Parts |
|---|---|
| Polyvinyl butyraldehyde acetal | 45 |
| Pale crepe rubber | 50 |
| Diethyl phthalate | 5 |
| Aluminum stearate | 1 |

The polyvinyl butyraldehyde acetal employed in this example was similar to that employed in Example I. Into the rubber in one batch was incorporated a suitable quantity of sulphur before the other components were added, while into the rubber of the second batch a suitable quantity of a suitable vulcanization accelerator was incorporated in the same manner. Thereafter, these two batches were combined into one batch and the resulting composition subsequently vulcanized in a customary manner. This vulcanized product was found to be somewhat firmer and more homogeneous than similar unvulcanized products.

It is obvious that there are many variations that may be introduced into the new compositions of this invention and the process of preparing the same. Particularly amenable to variation is the polyvinyl acetal resin. Thus, these acetals may be prepared from other vinyl ester resins than polyvinyl acetate and the degrees of polymerization of these vinyl esters are not limited to those given in the examples. The hydroxyl, ester and acetal group contents of these polyvinyl acetal resins may each be subjected to considerable variation. Furthermore, this invention is not limited to the particular carbonyl group-containing compounds specifically employed in the examples to acetalize the hydrolyzed polyvinyl esters. Thus, included within the scope of this invention are polyvinyl acetal resins prepared by reacting hydrolyzed polyvinyl esters with such carbonyl group-containing compounds as formaldehyde, acetaldehyde, propionaldehyde, butyraldehyde, valeraldehyde, hexaldehyde, heptaldehyde, benzaldehyde, crotonaldehyde, cyclohexanone and the like and mixtures thereof.

While pale crepe rubber was employed in each of the examples, it is obvious that other types of rubber can be substituted, such as Pará rubber, smoked sheets, etc. In regard to the relative proportions of rubber and the polyvinyl acetal resins, it has been found that these proportions may be widely varied but it is generally desirable that the amount of neither of these components be less than substantially 10% by weight of the total of the two components. Additional variations that may be introduced in carrying out the present invention include wide variation in the nature and proportion of the plasticizer mixed with the polyvinyl acetal resin, provided a homogeneous plasticized composition is produced. Under certain circumstances it may even be advantageous to employ the polyvinyl acetal resin without the addition of any plasticizer. Furthermore, it is obvious to those skilled in the art that other means of mixing the various components of the compositions of this invention may be substituted for the mixing rolls used in preparing the products described in the examples, that other mixing temperatures may be employed and that the order in which the several components are added on the mixing rolls is not limited to that given in the examples.

The inclusion of pigment or other coloring material in the compositions of the present invention is optional and both the nature and the amount of such materials may be widely varied. While it is frequently advantageous to include lubricants in the mixtures, the nature and amount of such additions may be subjected to considerable variation. Other modifying materials may also be included in the compositions of this invention when it is found advantageous to so do.

The new compositions of the present invention are obviously valuable for many purposes and, as previously indicated, are exceptionally well suited for golf ball covers. Thus, in addition to possessing resiliency, toughness, abrasion and cutting resistance, these new compositions possess the characteristic of flowing in and around the core windings of the golf balls during the molding of the covers on the cores without becoming so fluid as to flow out of the molds. Furthermore, these new compositions may be formed by other methods than molding, as for example, by extruding, calendering and the like.

This invention is limited solely by the claims attached hereto.

What is claimed:

1. A composition of matter comprising a polyvinyl acetal resin and rubber in the proportion of 45 parts of polyvinyl acetal resin for every 50 parts of rubber.

2. A composition of matter comprising a polyvinyl butyraldehyde acetal resin and rubber in the proportion of 50 parts of rubber for every 45 parts of polyvinyl butyraldehyde acetal resin.

3. A composition of matter comprising a polyvinyl acetal resin, rubber and a plasticizer for said polyvinyl acetal resin, in the proportion of 45 parts of polyvinyl acetal resin to 50 parts of rubber and 5–10 parts of plasticizer.

4. A vulcanizable molding composition comprising a polyvinyl acetal resin, rubber in the proportion of 45 parts of polyvinyl acetal resin for every 50 parts of rubber, and a vulcanizing agent.

5. A vulcanizable molding composition comprising a polyvinyl acetal resin, a plasticizer for said polyvinyl acetal resin and rubber in the proportion of 45 parts of polyvinyl acetal resin, 5–10 parts of plasticizer and 50 parts of rubber, and a vulcanizing agent comprising sulfur.

6. A composition of matter comprising a polyvinyl formaldehyde acetal resin and rubber in the proportion of 45 parts of polyvinyl formaldehyde acetal resin for every 50 parts of rubber.

WILLIAM E. WELCH.